United States Patent
Hanson et al.

(10) Patent No.: US 10,027,369 B2
(45) Date of Patent: *Jul. 17, 2018

(54) REMOTE UNIT FOR COMMUNICATING WITH BASE STATIONS AND TERMINAL DEVICES

(71) Applicant: CommScope Technologies LLC, Hickory, NC (US)

(72) Inventors: Van E. Hanson, Forest, VA (US); Michael J. Williamson, Clayton, NC (US); Thomas Kummetz, Kissing (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,294

(22) Filed: Jan. 22, 2018

(65) Prior Publication Data

US 2018/0145720 A1    May 24, 2018

Related U.S. Application Data

(63) Continuation of application No. 14/790,053, filed on Jul. 2, 2015, now Pat. No. 9,876,527, which is a
(Continued)

(51) Int. Cl.
*H04B 1/38* (2015.01)
*H04B 1/525* (2015.01)
(Continued)

(52) U.S. Cl.
CPC ............... *H04B 1/525* (2013.01); *H04B 1/40* (2013.01); *H04B 7/024* (2013.01); *H04L 5/14* (2013.01);
(Continued)

(58) Field of Classification Search
CPC .......... H04B 1/525; H04B 7/024; H04B 1/40; H04W 88/085; H04W 28/04; H04W 72/1273; H04L 5/14
(Continued)

(56) References Cited

U.S. PATENT DOCUMENTS 6,771,933 B1    8/2004  Eng et al.
7,831,203 B2   11/2010  Lee et al.
(Continued)

FOREIGN PATENT DOCUMENTS

EP    1227605 A2    7/2002
EP    1227605 A3    4/2005
(Continued)

OTHER PUBLICATIONS

European Patent Office, "Communication Pursuant to Rule 164(1) for EP Application No. 14764640.0", Foreign counterpart to U.S. Appl. No. 14/213,168, dated Oct. 6, 2016, pp. 1-8, Published in: EP.
(Continued)

*Primary Examiner* — Chieh M Fan
*Assistant Examiner* — Fitwi Hailegiorgis
(74) *Attorney, Agent, or Firm* — Fogg & Powers LLC

(57) ABSTRACT

A remote unit of a distributed antenna system includes: a transceiver configured to communicate RF signals between a master unit of the distributed antenna system and a terminal device, and receive downlink RF signals from a base station; and signal processing circuitry configured to provide downlink signals to the master unit. The remote unit receives instructions from a host unit of the distributed antenna system to establish a communication link with the base station in response to detecting a malfunction with respect to an additional communication link between the master unit and an additional base station.

20 Claims, 4 Drawing Sheets

Related U.S. Application Data continuation of application No. 14/213,168, filed on Mar. 14, 2014, now Pat. No. 9,106,315.

(60) Provisional application No. 61/790,515, filed on Mar. 15, 2013.

(51) Int. Cl.
*H04B 1/40* (2015.01)
*H04B 7/024* (2017.01)
*H04L 5/14* (2006.01)
*H04W 28/04* (2009.01)
*H04W 72/12* (2009.01)
*H04W 88/08* (2009.01)

(52) U.S. Cl.
CPC ....... *H04W 28/04* (2013.01); *H04W 72/1273* (2013.01); *H04W 88/085* (2013.01)

(58) Field of Classification Search
USPC .......................... 375/219; 370/328, 252, 343
See application file for complete search history.

(56) References Cited

U.S. PATENT DOCUMENTS

| | | | |
|---|---|---|---|
| 7,961,618 | B1 | 6/2011 | Prasad et al. |
| 8,165,100 | B2 | 4/2012 | Sabat et al. |
| 8,175,028 | B2 | 5/2012 | Subasic et al. |
| 8,310,963 | B2 | 11/2012 | Singh |
| 8,346,091 | B2 | 1/2013 | Kummetz et al. |
| 8,396,368 | B2 | 3/2013 | Tarlazzi et al. |
| 8,428,510 | B2 | 4/2013 | Stratford et al. |
| 8,521,172 | B2 | 8/2013 | Rosenau |
| 8,594,223 | B2 | 11/2013 | Ranson et al. |
| 8,873,585 | B2 | 10/2014 | Oren et al. |
| 9,876,527 | B2 | 1/2018 | Hanson et al. |
| 2010/0208777 | A1 | 8/2010 | Ogaz |
| 2010/0278530 | A1 | 11/2010 | Kummetz et al. |
| 2011/0135308 | A1 | 6/2011 | Tarlazzi et al. |
| 2011/0243201 | A1 | 10/2011 | Phillips et al. |
| 2012/0309328 | A1 | 12/2012 | Morrison et al. |
| 2013/0095870 | A1 | 4/2013 | Phillips et al. |
| 2013/0107763 | A1 | 5/2013 | Uyehara et al. |
| 2013/0136202 | A1 | 5/2013 | Kummetz et al. |
| 2013/0201916 | A1 | 8/2013 | Kummetz et al. |
| 2013/0260705 | A1 | 10/2013 | Stratford |
| 2013/0272441 | A1 | 10/2013 | Uyehara et al. |
| 2013/0336370 | A1 | 12/2013 | Jovanovic et al. |
| 2013/0337750 | A1 | 12/2013 | Ko |
| 2014/0016583 | A1 | 1/2014 | Smith |
| 2014/0050212 | A1 | 2/2014 | Braz et al. |
| 2014/0128089 | A1 | 5/2014 | Jang et al. |
| 2015/0326270 | A1 | 11/2015 | Hanson et al. |

FOREIGN PATENT DOCUMENTS

| | | |
|---|---|---|
| EP | 2733988 A2 | 5/2014 |
| WO | 2012173443 A2 | 12/2012 |
| WO | 2013012225 A2 | 1/2013 |
| WO | 2013033715 A2 | 3/2013 |
| WO | 2013137806 A1 | 9/2013 |

OTHER PUBLICATIONS

European Patent Office, "Extended European Search Report for EP Application No. 14764640.0", Foreign Counterpart to U.S. Appl. No. 14/213,168, dated Jan. 17, 2017, pp. 1-17, Published in: EP.
International Patent Application No. PCT/US2014/028663, International Search Report and Written Opinion dated Jul. 10, 2014, 11 Pages, Published in: PCT.
United States Patent and Trademark Office, "Notice of Allowance for U.S. Appl. No. 14/790,053", dated Sep. 11, 2017, pp. 1-8. Published in: U.S.
United States Patent and Trademark Office, "Office Action for U.S. Appl. No. 14/790,053", dated May 22, 2017, pp. 1-31, Published in: U.S.
United States Patent and Trademark Office, "Office Action for U.S. Appl. No. 14/790,053", dated Oct. 5, 2016, pp. 1-24, Published in: U.S.
United States Patent and Trademark Office, "Notice of Allowance for U.S. Appl. No. 14/213,168", dated Apr. 10, 2015, pp. 1-18, Published in: U.S.

REMOTE UNIT FOR COMMUNICATING WITH BASE STATIONS AND TERMINAL DEVICES

CROSS-REFERENCE TO RELATED APPLICATIONS

This is a continuation of U.S. patent application Ser. No. 14/790,053 filed Jul. 2, 2015 and titled "REMOTE UNIT FOR COMMUNICATING WITH BASE STATIONS AND TERMINAL DEVICES", which is a continuation of U.S. patent application Ser. No. 14/213,168 filed Mar. 14, 2014 and titled "Remote Unit for Communicating with Base Stations and Terminal Devices", which claims priority to U.S. Provisional Application Ser. No. 61/790,515 filed Mar. 15, 2013 and titled "Remote Antenna Unit for Communicating with Base Stations and Mobile Communication Devices", the contents of each of which are hereby incorporated by reference.

TECHNICAL FIELD

The present disclosure relates generally to telecommunications systems and more particularly (although not necessarily exclusively) to remote units of distributed antenna systems that can communicate with base stations and terminal devices.

BACKGROUND

A distributed antenna system ("DAS") may include master units and remote units. Master units may be connected to base stations. Master units receive downlink signals from base station and distribute downlink signals in analog or digital format to multiple remote units. The remote units transmit downlink signals to terminal devices within coverage areas serviced by the remote units. In the uplink direction, signals from terminal devices may be received by the remote units. The remote units may combine uplink signals and transmit the combined uplink signals to master units. Master units may transmit uplink signals to the serving base stations.

SUMMARY

Certain aspects and features of the present invention are directed to distributed antenna systems in which remote units can communicate with base stations and terminal devices.

In one aspect, a distributed antenna system is provided. The distributed antenna system can include a master unit that is communicatively coupled to a first remote unit and a second remote unit. The first remote unit can communicate RF signals between the master unit and a terminal device. The first remote unit can also receive analog downlink RF signals from a base station and convert the analog downlink RF signals to digital downlink signals. The first remote unit can provide the digital downlink signals to the master unit. The master unit can transmit the digital downlink signals received from the first remote unit to the second remote unit.

In another aspect, a remote unit of a distributed antenna system is provided. The remote unit can include a signal processing module and a transceiver. The transceiver can communicate RF signals between a master unit of the distributed antenna system and a terminal device. The transceiver can also receive analog downlink RF signals from a base station. The signal processing module can convert the analog downlink RF signals to digital downlink signals and provide the digital downlink signals to the master unit.

In another aspect, a distributed antenna system for providing device-to-device communication is provided. The distributed antenna system can include a first remote unit, a second remote unit, and a master unit that is communicatively coupled to the first and second remote units. The first remote unit can receive a signal from a first terminal device. The master unit can receive the signal from the first remote unit and provide the signal to the second remote unit for transmission to the second terminal device. The second remote unit can transmit the signal to a second terminal device.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Figure 1:
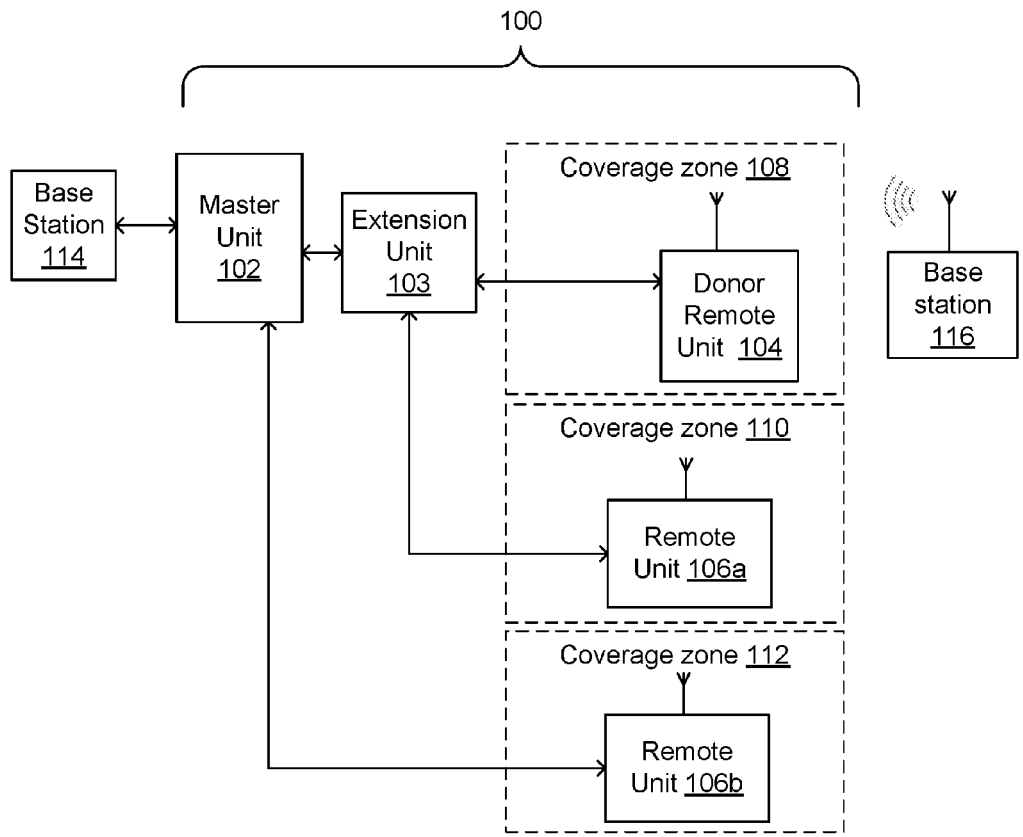
FIG. 1 is a block diagram depicting an example of a distributed antenna system that can include a donor remote unit for communicating with base stations according to one aspect of the present disclosure.

A remote unit of a distributed antenna system ("DAS") is disclosed that can communicate RF signals with base stations in addition to communicating RF signals with terminal devices in a coverage zone serviced by the remote unit. In some aspects, a master unit can route signals received from the remote unit to other remote units for transmission to terminal devices.

In accordance with some aspects, a donor remote unit can receive both uplink signals from terminal devices and downlink signals from base stations. The donor remote unit can transmit downlink signals received from base stations to a master unit for distribution via the DAS. The donor remote unit can also receive downlink signals from a master unit and transmit the downlink signals to terminal devices in a coverage zone serviced by the donor remote unit. In some aspects, the donor remote unit can also transmit the signals received from a base station to other remote units for transmission to terminal devices in other coverage zones serviced by the other remote units.

As used herein, the term "donor remote unit" can refer to any remote unit that can include or be communicatively coupled to one or more antennas and that can be configured to wirelessly receive downlink signals from a base station and to wirelessly receive uplink signals from terminal devices. For example, a donor remote unit can include a transceiver that is tuned for wirelessly receiving downlink signals in a frequency band used by a base station. The donor remote unit can provide an RF link between the DAS and another base station in addition to the base stations in communication with the master unit of the DAS. For example, a donor remote unit can receive signals in an analog RF format from a base station and provide signals in a digital format to one or more devices in the DAS via a direct connection. For cases in which few terminal devices are served by an operator within a coverage area of the DAS, a donor remote unit can provide an RF link to a macrocell serviced by a base station in or near the coverage area of the DAS. The RF link provided by the donor remote unit can reduce or eliminate costs associated with installing additional base stations to service a smaller number of terminal devices.

As used herein, the term "terminal device" can refer to an electronic device used to communicate voice and/or data via a telecommunications system, such as (but not limited to) a small cell network or other cellular network. Other terminology used to refer to terminal devices and non-limiting examples of such devices can include mobile stations, mobile devices, access terminals, subscriber stations, terminal mobile terminals, remote stations, user terminals, terminals, subscriber units, cellular phones, smart phones, personal digital assistants ("PDAs"), laptop computers, netbooks, e-readers, wireless modems, etc.

The RF link provided by the donor remote unit can reduce or eliminate the need to use a separate RF repeater to receive signals from a nearby macrocell and transmit the received signals to the DAS. A donor remote unit may be smaller than a repeater unit. The smaller size of a donor remote unit may allow the donor remote unit to be more easily positioned in different coverage areas than a repeater.

In additional or alternative aspects, remote units for a DAS can be configured for device-to-device communication between terminal devices in a coverage area serviced by the DAS. A master unit or other unit in the DAS can receive signals within a defined bandwidth from multiple remote units. The level of the signals within the bandwidth can be compared with a threshold signal level. Signals having a signal level above the threshold signal level can be summed or otherwise combined. The combined signals can be routed to remote units whose signal level is below the threshold. The combined signal can be transmitted by the remote units. In some aspects, a frequency shift can be applied to the combined signal prior to transmission by the remote units.

As used herein, the term "device-to-device communication" can refer to a mode of communication between or among terminal devices that communicate via a DAS in which the signal traffic from one terminal device to another terminal device does not pass through a centralized base station or other device in the telecommunication system. Signal traffic can include voice communications or data communications intended for consumption by a user of a terminal device. Device-to-device communication may be implemented in a DAS by receiving signals from a first terminal device at a first remote unit, providing the received signals to a second remote unit via a master unit or extension unit, and transmitting the signals from the second remote unit to a second terminal device.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

FIG. 1 is a block diagram depicting an example of a DAS 100 that can include a donor remote unit 104 for communicating with base stations according to one aspect.

The DAS 100 can include a master unit 102, an extension unit 103, a donor remote unit 104, and remote units 106a, 106b. The donor remote unit 104 and remote units 106a, 106b can provide signal coverage to terminal devices positioned in respective coverage zones 108, 110, and 112.

The master unit 102 can receive downlink signals from a base station 114 and transmit uplink signals to the base station 114. Any suitable communication link can be used for communication between the base station 114 and the master unit 102, such as (but not limited to) a direct connection or a wireless connection. A direct connection can include, for example, a connection via a copper, optical fiber, or other suitable communication medium. In some aspects, the master unit 102 can include an external repeater or internal RF transceiver included on a donor card to communicate with the base stations. In some aspects, the master unit 102 can combine downlink signals received from different base stations 114. The master unit 102 can transmit the combined downlink signals to one or more of the donor remote unit 104 and the remote units 106a, 106b.

In some aspects, the master unit 102 can be connected to remote units via one or more extension units or other intermediate devices. For example, FIG. 1 depicts a master unit 102 that is communicatively coupled to an extension unit 103. The extension unit 103 is communicatively coupled to the donor remote unit 104 and the remote unit 106a. In additional or alternative aspects, the master unit 102 can be connected to remote units directly without using extension units or other intermediate devices. For example, FIG. 1 depicts a master unit 102 that is communicatively coupled to a remote unit 106b without using an extension unit.

The donor remote unit 104 and the remote units 106a, 106b can provide signal coverage in coverage zones 108, 110, 112 by transmitting downlink signals to terminal devices and receiving uplink signals from the terminal devices. The donor remote unit 104 and the remote units 106a, 106b can transmit uplink signals to the master unit 102. The master unit 102 can combine uplink signals received from the donor remote unit 104 and the remote units 106a, 106b for transmission to the base station 114.

For illustrative purposes, FIG. 1 depicts a DAS 100 that communicates with two base stations 114, 116 and that includes a single master unit 102, a single extension unit 103, a single donor remote unit 104, and two remote units 106a, 106b. However, a DAS 100 can communicate with any number of base stations and can include any suitable number of master units 102, extension units 103, donor remote units 104, and remote units 106a, 106b. In some aspects, a DAS 100 can omit one or more of the extension unit 103 or the remote units 106a, 106b.

The donor remote unit 104 can communicate with both the master unit 102 (via the extension unit 103) and a base station 116 within a transmission range of the coverage zone 108. For example, the donor remote unit 104 can receive downlink RF signals from the base station 116 and transmit uplink RF signals to the base station 116. Communicating RF signals with the base station 116 can allow the donor remote unit 104 to operate as an RF donor pickup transceiver in addition to a mobile-side transceiver. The donor remote unit 104 can communicate downlink signals received from the base station 116 to the master unit 102.

The master unit 102 can combine the downlink signals received from the donor remote unit 104 with downlink signals in the same frequency band received from other base stations. The master unit 102 can communicate the combined downlink signal to one or more of the other remote units 106a, 106b. The downlink signal can be transmitted by the other remote units 106a, 106b.

In a non-limiting example, the DAS 100 depicted in FIG. 1 can be used to provide signal coverage for a coverage area serviced by multiple base stations 114 in communication with the master unit 102 and a neighboring base station 116 (such as, but not limited to, a macrocell base station) in communication with the donor remote unit 104. A first base station 114 that is communicatively coupled to the master unit 102 may operate in the sub-band A of frequency band 1. A second base station 114 that is communicatively coupled to the master unit 102 may operate in the sub-band B of frequency band 1. A third base station 114 that is communicatively coupled to the master unit 102 may operate in the sub-band C of frequency band 2. The macrocell base station 116 may operate in the sub-band D of frequency band 2. The master unit 102 can combine signals received from the first and second base stations 114 into a single signal in frequency band 1. The combined signal in frequency band 1 can include the sub-bands A and B. The master unit 102 can transmit the combined signal having frequencies in the sub-bands A and B of frequency band 1 to remote units 106a, 106b in the respective coverage zones 110, 112 of the DAS 100.

The donor remote unit 104 can receive signals in frequency band 2. The donor remote unit 104 can isolate signals in a sub-band D of frequency band 2 by applying a bandpass filter that attenuates signals having frequencies outside of the sub-band D. The donor remote unit 104 can transmit the signals in the sub-band D to the master unit 102 via the extension unit 103. The master unit 102 can combine signals in the sub-band C of frequency band 2 received from the third base station 114 with signals in the sub-band D received from the macrocell base station via the donor remote unit 104. The master unit 102 can transmit the combined signal having frequencies in the sub-bands C and D of frequency band 2 to remote units 106a, 106b. The master unit 102 can also transmit signals having frequencies in the sub-band C of frequency band 2 to the donor remote unit 104 for transmission to terminal devices.

Figure 2:
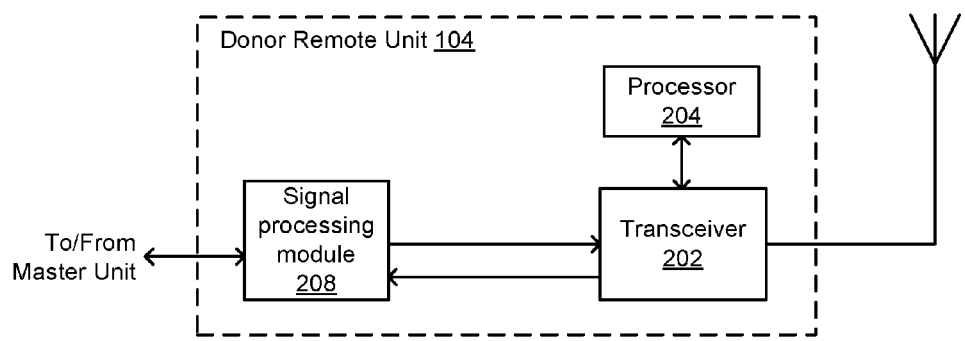
FIG. 2 is a block diagram depicting the donor remote unit of FIG. 1 according to one aspect of the present disclosure.

FIG. 2 is a block diagram depicting an example of the donor remote unit 104 according to one aspect. The donor remote unit 104 can include a transceiver 202, a processor 204, and an signal processing module 208.

The transceiver 202 can be configured to receive downlink RF signals from a base station and transmit uplink RF signals to the base station. In some aspects, the transceiver 202 can be tuned to different frequencies based on command signals received from the processor 204.

The processor 204 can include any device suitable for executing program instructions to control operation of the donor remote unit 104. Examples of processor 204 include a microprocessor, an application-specific integrated circuit ("ASIC"), a field-programmable gate array ("FPGA"), or other suitable processor. The processor 204 may include one processor or any number of processors.

The donor remote unit 104 can communicate with the master unit 102 via any suitable signal processing module 208, such as (but not limited to) a physical layer transceiver or other suitable component configured for communicating with a master unit 102. The signal processing module 208 can process uplink and downlink signals for communication with the master unit 102 or extension unit 103. The signal processing module 208 can include one or more digital components or devices, one or more analog components or devices, or any combination thereof for communicating signals between the donor remote unit 104 and the master unit 102 or extension unit 103. For example, the signal processing module 208 can include one or more digital signal processors, one or more filters, one or more digital-to-analog converters, one or more analog-to-digital converters, etc. The signal processing module 208 can convert analog downlink signals received from a base station 116 into digital downlink signals to be provided from the donor remote unit 104 to the master unit 102.

In some aspects, the donor remote unit 104 can be configured to receive both uplink signal and signals from other base station by using a transceiver 202 that does not include a duplexer. In some remote units that do not receive RF downlink signals transmitted by base stations, a fixed duplexer may provide isolation between transmit signals in received signals. Using a transceiver 202 that does not include a duplexer can allow a receiver component of the transceiver 202 to be tuned to receive signals in any frequency band, including one or more frequency bands used by the base station 116.

Figure 3:
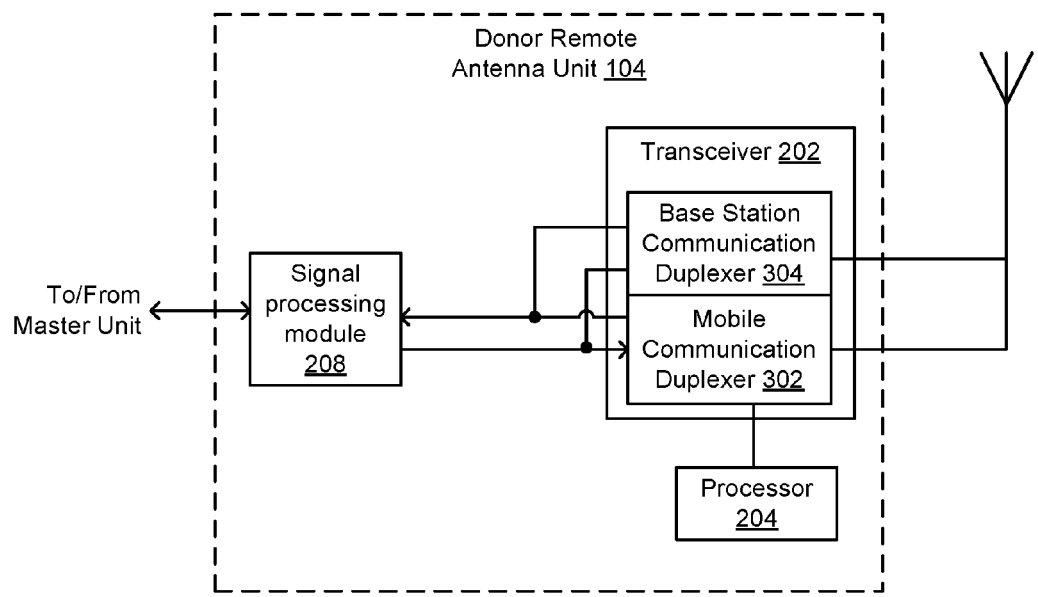
FIG. 3 is a block diagram depicting an example of the donor remote unit of FIG. 2 with multiple duplexers according to one aspect of the present disclosure.

In other aspects, the donor remote unit 104 can include at least two duplexers. For example, FIG. 3 is a block diagram depicting an example of a donor remote unit 104 that includes multiple duplexers according to one aspect. The donor remote unit depicted in FIG. 2 includes a mobile communication duplexer 302 and a base station communication duplexer 304. The mobile communication duplexer 302 can be used for communication with terminal devices. The mobile communication duplexer 302 can be configured to provide isolation between analog RF uplink signals received from one or more terminal devices and analog RF downlink signals transmitted to the one or more terminal devices. The base station communication duplexer 304 can be used for communication with a base station. The base station communication duplexer 304 can be configured to provide isolation between analog RF downlink signals (e.g. analog downlink RF signals) received from a base station 116 and other signals transmitted by the donor remote unit 104 (e.g., analog RF uplink signals transmitted to the base station 116, analog RF downlink signals transmitted to terminal devices, etc.).

Figure 4:
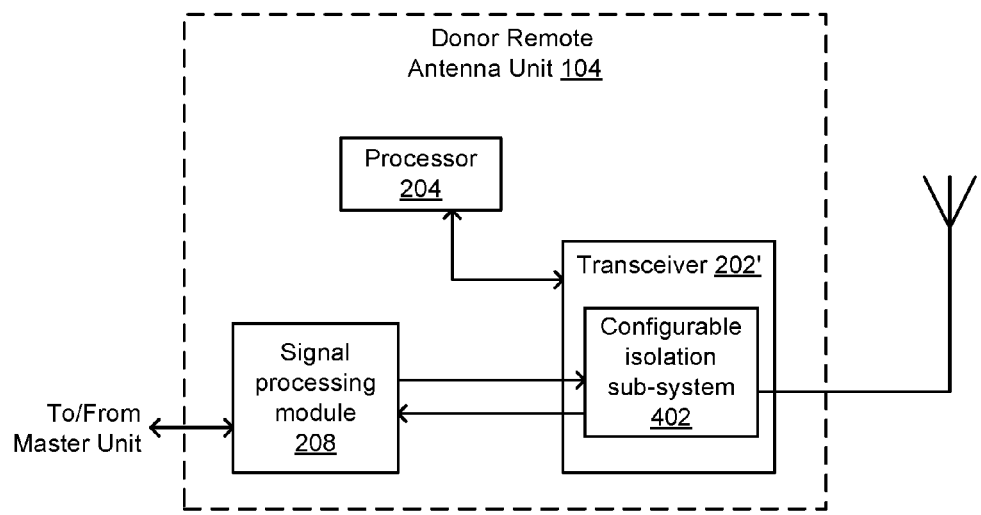
FIG. 4 is a block diagram depicting an alternative example of the donor remote unit of FIG. 2 with a configurable isolation sub-system for communicating in different frequency bands according to one aspect.

In other aspects, the donor remote unit 104 can include a configurable isolation sub-system. For example, FIG. 4 is a block diagram depicting an alternative example of a donor remote unit 104 that includes transceiver 202' with a configurable isolation sub-system 402 for communicating in different frequency bands according to one aspect. The configurable isolation sub-system 402 can be configured to provide isolation between signals transmitted to terminal devices and signals received from the terminal devices. The configuration of the configurable isolation sub-system 402 can be modified to allow the donor remote unit 104 to communicate with one or more neighboring base stations 116.

In some aspects, the configurable isolation sub-system 402 can include a single-step configurable filter that can include one or more bandpass filters. The desired downlink frequency band of a single-step configurable filter can be manually selected in a single physical step, such as (but not limited to) using a switch matrix to select a channel corresponding to a particular frequency band on a multi-channel switch filter bank.

In additional or alternative aspects, the configurable isolation sub-system 402 can include an electronically configurable filter. An electronically configurable filter may include one or bandpass filters that can be configured electronically. Configuring the filter can include receiving an electronic control signal and responding to the electronic control signal by changing the frequency response accordingly. The frequency response may be the desired frequency band to be passed. The electronic control signal may be received from an external controller. The electronically configurable filter can include a microprocessor or similar device that can respond to the electronic control signal by configuring the electronically configurable filter to have a desired frequency response. In some aspects, a bandpass filter can include one or more varactor diodes. The frequency response of the bandpass filter can be adjusted by varying the capacitance of one or more varactor diodes in response to the electronic control signal. The capacitance of the varactor diodes can be varied by applying varying input voltages to terminals of the varactor diodes. Altering the capacitance of one or more varactor diodes can alter both the center frequency and bandwidth of the bandpass filter. In some aspects, the source of the applied voltage may be disposed in the electronically configurable filter, with applied voltage levels controlled by the microprocessor in response to an electronic control signal from the external controller. In other aspects, the source of the applied voltage may be an external device controlled by the external controller.

In some aspects, a DAS 100 can use donor remote units 104 for communication with base stations without using a direct connection between a master unit 102 and one or more base stations 114. For example, a DAS 100 may include multiple donor remote units 104 that can communicate with base stations 116 via a wireless RF communication link or other suitable wireless link. Such a configuration can be used for a DAS 100 servicing a coverage area in which a preferable location to receive RF signals from one base station is different from a preferable location to receive RF signals from a different base station. Such a configuration can also be used for a DAS 100 using n×n multiple-input and multiple-output ("MIMO") systems, in which n donor remote units 104 can be positioned at different locations for receiving MIMO signals with sufficient spatial diversity. Using donor remote units 104 for communication with base stations 116 rather than using a direct connection between a master unit 102 and base stations 114 can extend coverage for public safety communication systems or other telecommunication systems having reduced capacity (i.e., fewer available channels and/or frequency bands).

In additional or alternative aspects, the donor remote unit 104 can be used to increase the reliability of coverage provided by a DAS 100. For example, a base station 114 connected to the master unit 102 may experience a malfunction that prevents or degrades signal coverage provided by the base station 114. A malfunction can be caused by events such as construction or other operations causing a cable link to be severed, an equipment failure in the base station 114, etc.

In a non-limiting example, a DAS 100 can have a standard operation mode in the absence of a base station malfunction and an auxiliary mode of operation in the presence of a base station malfunction. In the standard operation mode, the donor remote unit 104 can be configured to receive downlink signals from the master unit 102 and to ignore downlink signal traffic from a neighboring base station 116. In the auxiliary mode, the donor remote unit 104 can be configured to establish a communication link with the neighboring base station 116 for receiving downlink traffic. Establishing such a communication link with the neighboring base station 116 can reduce or prevent interruptions of at least some telecommunication services in the coverage area of the DAS 100. For example, some telecommunications services (e.g., normal voice calls, etc.) provided by the base station 114 may be interrupted by a malfunction with respect to the base station 114. The auxiliary mode can be used to provide a subset of telecommunication services (e.g., public safety services) that can be accessed via the neighboring base station 116.

Figure 5:
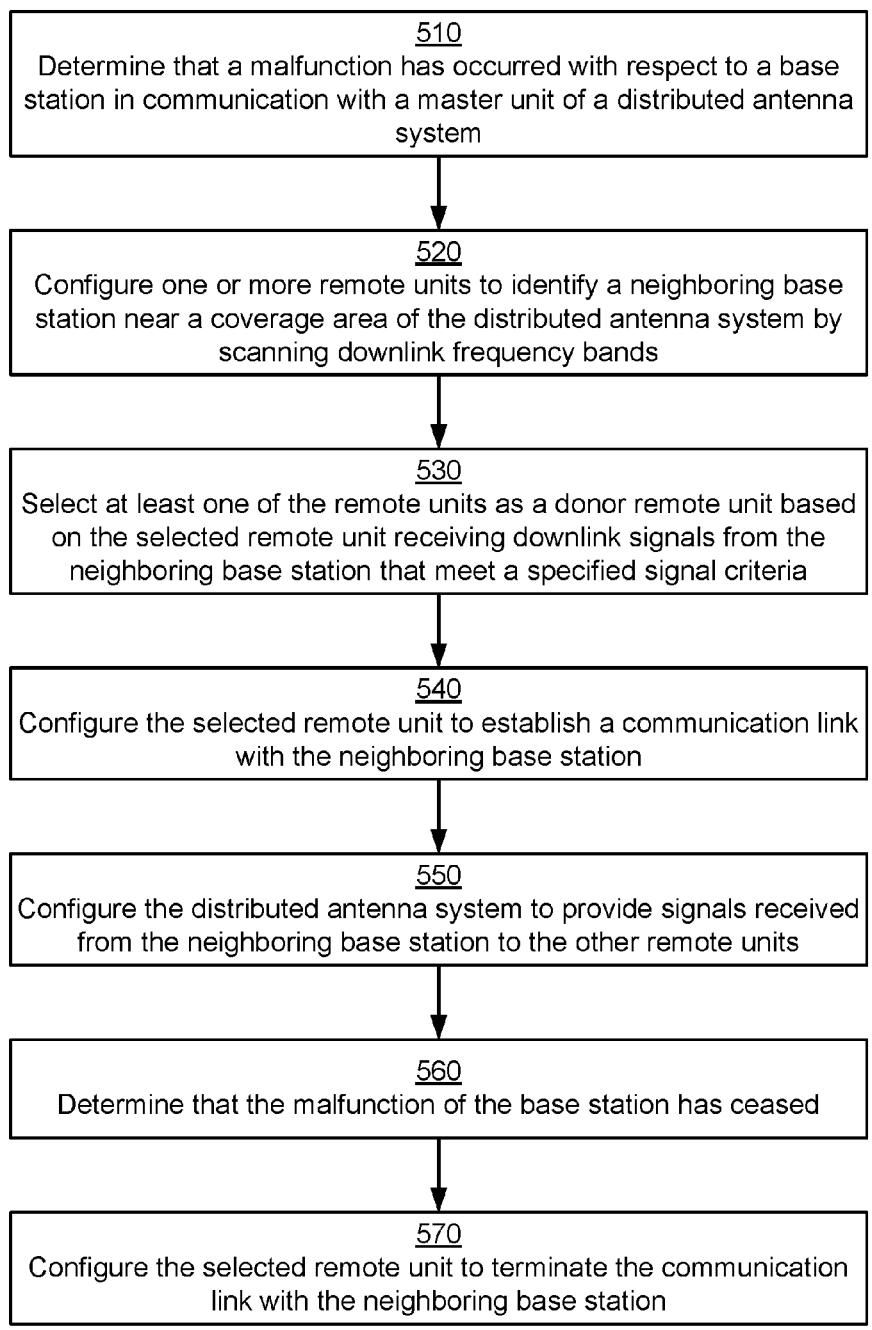
FIG. 5 is a flow chart depicting a process for using the donor remote unit of FIG. 1 to compensate for a base station malfunction according to one aspect of the present disclosure.

FIG. 5 is a flow chart depicting a process 500 for using the donor remote unit 104 to compensate for a base station malfunction according to one aspect. The process 500 is described with respect to the system depicted in FIG. 1. Other implementations, however, are possible.

The process 500 involves determining that a malfunction has occurred with respect to a base station 114 in communication with a master unit 102 of a DAS 100, as depicted at block 510. In some aspects, the master unit 102 can determine that a malfunction has occurred based on a loss of communication with the base station 114. In one non-limiting example, the master unit 102 can determine that the malfunction has occurred based on an absence of downlink traffic from the base station 114 for an amount of time exceeding a threshold amount of time. In another non-limiting example, the master unit 102 can determine that the malfunction has occurred based on a failure of the base station 114 to respond to signaling or other control communications from the master unit 102 that are used for establishing or maintaining a communication link between the base station 114 and the master unit 102.

In some aspects, one or more devices in the DAS 100 can provide a notification that the base station 114 is malfunctioning. For example, one or more of the master unit 102 or the donor remote unit 104 can generate an alarm notification in response to the donor remote unit 104 being used to provide signal coverage in the DAS 100. Non-limiting examples of such an alarm notification include a data message transmitted to a communication device or outputted in a graphical interface, an audible indicator generated by one or more of the master unit 102 or the donor remote unit 104, a visual indicator (e.g., a flashing light) generated by one or more of the master unit 102 or the donor remote unit 104, etc.

The process 500 also involves configuring one or more remote units to identify a neighboring base station near a coverage area of the DAS 100 by scanning downlink frequency bands, as depicted at block 520. For example, a DAS 100 may include multiple donor remote units 104. A master unit 102 can respond determining the base station malfunction by providing control signals to the multiple donor remote units 104 to search for neighboring base stations 116. A neighboring base station can include any base station from which signals having specified signal criteria can be received by one or more donor remote units 104. For each donor remote unit 104 that receives the control signal from the master unit, a respective processor 204 can generate an additional control signal that instructs a respective transceiver 202 to scan one or more frequency bands for downlink signals or other signals that are transmitted by a base station 116. The transceiver 202 can be tuned or otherwise configured to receive signals in one or more frequency bands specified by the control signal. The processor 204 can analyze signal traffic in the one or more scanned frequency bands to identify one or more frequencies used by the base station 116 to transmit downlink signals.

The process 500 also involves selecting at least one of the remote units as a donor remote unit based on the selected remote unit receiving downlink signals from the neighboring base station that meet a specified signal criteria, as depicted at block 530. For example, at least two donor remote units 104 may be within transmission range of a neighboring base station 116. One of the donor remote units 104 may receive signals from the neighboring base station 116 that satisfy the signal criteria and the other donor remote unit 104 may receive signals from the neighboring base station 116 that fail to satisfy the signal criteria. Non-limiting examples of satisfying the signal criteria include as exceeding a threshold signal level, having noise below a threshold noise level or satisfying another quality parameter, etc. The master unit 102 or another control device in the DAS 100 can select the donor remote unit 104 that receives signals from the neighboring base station 116 that satisfy the signal criteria to establish a communication link with the neighboring base station 118. The donor remote unit 104 that receives signals from the neighboring base station 116 failing to satisfy the signal criteria can be used to communicate signals with terminal devices in the coverage area of the DAS 100.

The process 500 also involves configuring the selected remote unit to establish a communication link with the neighboring base station 116, as depicted at block 540. For example, a selected donor remote unit 104 can configure its transceiver 202 to receive downlink signals transmitted by the neighboring base station 116 and to transmit uplink signals received from the master unit 102 to the neighboring base station 116.

The process 500 also involves configuring the DAS 100 to provide signals received from the neighboring base station 116 to the other remote units in the DAS 100, as depicted at block 550. In some aspects, the master unit 102 can be configured in the auxiliary mode to utilize the signals received from the donor remote unit 104 as downlink signals. The master unit 102 can process the signals received from the donor remote unit 104 in the same manner that the master unit 102 would process signals received from the base station 114. The master unit 102 can provide the signal received from the donor remote unit 104 to one or more remote units 106a, 106b.

In additional or alternative aspects, an extension unit 103 in communication with the donor remote unit 104 can be used to provide the donor signal to one or more remote units that are communicatively coupled to the extension unit 103.

The process 500 also involves determining that the malfunction of the base station 114 has ceased, as depicted at block 560. For example, the master unit 102 can determine that the malfunction has ceased based on receiving downlink traffic from the base station 114 or receiving other signal traffic from the base station 114.

The process 500 also involves configuring the donor remote unit 104 to terminate the communication link with the neighboring base station 118 in response to determining that the malfunction has ceased, as depicted at block 570. For example, a control signal can be provided to the donor remote unit 104 that is selected to receive signals from the base station 116 in auxiliary mode. The control signal can notify the donor remote unit 104 to switch from auxiliary mode to standard operation mode. The processor 204 of the donor remote unit 104 can respond to the control signal by configuring the transceiver 202 to cease communicating signals with the base station 116.

In some aspects, the DAS 100 can automatically switch to an auxiliary mode. In other aspects, the DAS 100 can be switched to an auxiliary mode by an operator performing one or more operations to reconfigure one or more of the master unit 102 and the donor remote units 104.

Figure 6:
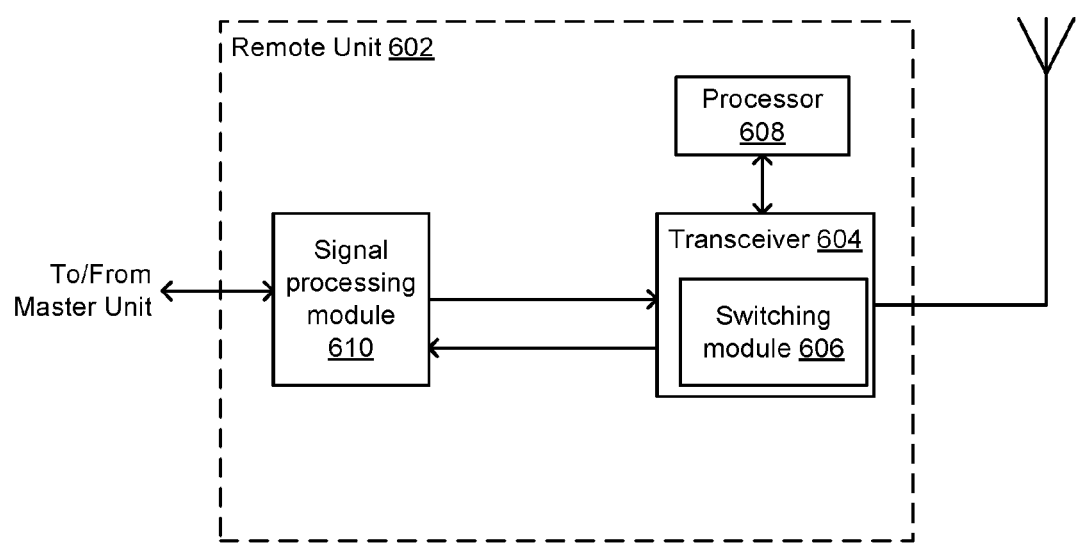
FIG. 6 is a block diagram depicting a remote unit configured for device-to-device communication according to one aspect of the present disclosure.

In additional or alternative aspects, remote units can be configured to provide device-to-device communication between terminal devices. For example, FIG. 6 is a block diagram depicting an example of a remote unit 602 configured for device-to-device communication according to one aspect. The remote unit 602 depicted in FIG. 6 can be included in the DAS 100 and can be communicatively coupled to the master unit 102 or the extension unit 103.

The remote unit 602 can include a processor 608 configured to execute a suitable algorithm for determining whether to switch between a transmit mode to a receive mode. The remote unit 602 can also include a transceiver 604 that has a switching module 606 for switching the remote unit 602 between a transmit mode for transmitting device-to-device and a receive mode. The switching module 606 can include one or more switches that can be configured by the transceiver in response to control signals received from the processor 608. The remote unit 602 can also include a signal processing module 610 that can perform one or more signal processing functions, as previously described with respect to the signal processing module 208 in FIG. 2.

In some aspects, the device-to-device communication can involve a simplex operation (e.g., push-to-talk). In some aspects, the device-to-device communication can be a duplex operation.

In the simplex case, at least one remote unit 602 can be set to a "receive" mode for receiving signals from a first terminal device and at least one additional remote unit 602 can be set to a "transmit" mode for transmitting signals to a second terminal device. One or more remote units 602 near a transmitting terminal device can be set to a receive mode for receiving signals from the terminal device. Other remote units 602 that are further from the transmitting terminal device can be set to a transmit mode for transmitting the signals to a receiving terminal devices.

In some aspects, a remote unit 602 can switch between a transmit mode and a receive mode based on a signal level of signals received from a transmitting terminal device. For a received signal level above a threshold, a remote unit 602 can switch to a receive mode. For a received signal level below a threshold, the remote unit 602 can switch to a transmit mode. In additional or alternative aspects, signals received at multiple remote units 602 from a terminal device can be analyzed to estimate or otherwise determine a geographic location of the terminal device. One or more remote units 602 can be identified as being located at less than at a threshold distance from the geographic location of the terminal device. The one or more remote units 602 located at less than a threshold distance from the terminal device can switch to a receive mode.

In some aspects, the remote units 602 can switch from a device-to-device mode to a standard operation mode in the absence of device-to-device communication. A standard operation mode can include the remote units 602 transmitting uplink signals received from terminal devices to master units 102 of the DAS 100. For example, if all simplex terminal devices in a DAS 100 are idle, all remote units 602 can switch to a standard operation mode.

In some aspects, a master unit 102 can coordinate device-to-device communication via multiple remote units 602.

When a terminal device starts to transmit within the DAS 100 coverage area, one or more remote units 602 can receive the signal from the terminal device. The master unit 102 can monitor signals received by the remote units 602. The master unit 102 can detect that a received signal from a given remote unit 602 has a signal level above a minimum defined level (e.g., an un-squelch threshold). The master unit 102 can combine a signal having a signal level above the threshold that is received from a remote unit 602 with other signals having signal levels above the threshold that are received from other remote units 602. For example, received signals having signals above the threshold can be added together into a composite sum. The combined signal can be transmitted to remote units 602 that are not receiving the signal above the threshold.

In some aspects, a terminal device can move between different coverage zones serviced by different remote units 602. As the transmitting device moves, a signal level of a signal transmitted by the terminal device may rise above and fall below a specified threshold at different remote units 602. If a signal level for a given remote unit 602 falls below the threshold, the master unit 102 can exclude or otherwise omit that signal from the summing operation. The master unit 102 can configure the remote unit 602 to switch from a receive mode to a transmit mode. The transceiver 604 of the remote unit 602 can be switched to a transmit mode for transmitting the newly reconfigured summed signal. Conversely, if a signal level for a given remote unit 602 rises above the threshold, the master unit 102 can add that signal to the summing operation. The master unit 102 can configure the remote unit 602 to switch from a transmit mode to a receive mode.

The master unit 102 can configure the remote unit 602 by transmitting control signals to a remote unit 602. The processor 608 can configure the transceiver 604 in response to the control signals. For example, if a master unit 102 determines that the remote unit 602 is receiving signals having signal levels above the threshold signal level (e.g., as a result of a simplex terminal device being keyed), the master unit 102 can provide a control signal that instructs the remote unit 602 to switch to a transmit mode. The transceiver 604 of the remote unit 602 can be switched to the transmit mode by the processor 608 in response to the control signal. If the master unit 102 determines that the remote unit 602 is receiving signals having signal levels below the threshold signal level (e.g., as a result of a simplex terminal device being un-keyed), the master unit 102 can provide an additional control signal that instructs the remote unit 602 to switch from the transmit mode to a receive mode. The transceiver 604 of the remote unit 602 can be switched to the receive mode by the processor 608 in response to the additional control signal.

In some aspects, a remote unit 602 may be configured to transmit signals and receive signals on the same frequency. The remote unit 602 can distinguish between signals received from a terminal device and signals transmitted by the remote unit 602 itself by adding a frequency shift to the signals transmitted by the remote unit 602. The frequency shift can de-correlate signals transmitted by the remote unit 602 from signals received from the terminal device. A received signal received from a terminal device can be distinguished from the signals that are transmitted by the remote unit.

In some aspects, one or more signals received by a remote unit configured for device-to-device communication can be transmitted to a base station or other telecommunication device via the master unit 102. For example, a master unit 102 can be communicatively coupled to one or more other DAS's. One or more signals received by a remote unit configured for device-to-device communication can be communicated to other remote units 602 and to the master unit 102 that is communicatively coupled to the one or more other DAS's.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed is:

1. A distributed antenna system comprising:
   a master unit having first circuitry;
   a first remote unit having second circuitry and communicatively coupled to the master unit;
   a second remote unit having third circuitry and communicatively coupled to the master unit;
   wherein the first remote unit is configured to:
      receive downlink RF signals from a base station; and
      provide downlink signals to the master unit; and
   wherein the master unit is configured to:
      transmit the downlink signals received from the first remote unit to the second remote unit; and
      instruct the first remote unit to establish a different communication link with the base station in response to detecting a malfunction with respect to an additional communication link between the master unit and an additional base station.

2. The distributed antenna system of claim 1, wherein the master unit is further configured to:
   communicate signals between the additional base station and the second remote unit.

3. The distributed antenna system of claim 1, wherein the first remote unit is further configured:
   to communicate RF signals between the master unit and a terminal device.

4. The distributed antenna system of claim 3, wherein the first remote unit includes:
   a first duplexer configured to isolate downlink RF signals transmitted to the terminal device from uplink RF signals received from the terminal device; and
   a second duplexer configured to isolate the uplink RF signals transmitted to the base station from downlink RF signals received from the base station.

5. The distributed antenna system of claim 3, wherein the first remote unit comprises:
   a configurable isolation sub-system that is configured to operate in a first mode and a second mode, wherein the configurable isolation sub-system is configured to:
      isolate downlink RF signals transmitted to the terminal device from uplink RF signals received from the terminal device when operating in the first mode; and
      isolate the uplink RF signals transmitted to the base station from downlink RF signals received from the base station.

6. The distributed antenna system of claim 5, wherein the configurable isolation sub-system includes:
   at least one configurable filter configured to:
      attenuate signals outside of a first frequency band for receiving the downlink RF signals from the base station when operating in the first mode; and attenuate signals outside of a second frequency band for receiving the uplink RF signals from the terminal device when operating in the second mode.

7. The distributed antenna system of claim 1,
wherein the first remote unit is further configured to:
receive a signal from the terminal device; and
provide the signal to the master unit;
wherein the master unit is further configured to:
provide the signal received from the first remote unit to the second remote unit;
wherein the second remote unit is configured to:
transmit the signal to at least one additional terminal device.

8. The distributed antenna system of claim 1, wherein each of the first and second remote units is further configured to:
identify the base station by scanning downlink frequency bands; and
detect signal traffic from the base station in at least one of the scanned downlink frequency bands;
wherein the master unit is further configured to configure the first remote unit to establish the different communication link with the base station based on the signal traffic detected by the first remote unit exceeding a threshold signal level or satisfying specified signal quality criteria.

9. The distributed antenna system of claim 8, wherein the master unit is further configured to respond to detecting a cessation of the malfunction by configuring the first remote unit to terminate the different communication link with the base station.

10. The distributed antenna system of claim 1, wherein the first remote unit is further configured to:
convert the RF signals received from the base station to the downlink signals provided to the master unit.

11. A remote unit of a distributed antenna system, the remote unit comprising:
a transceiver configured to:
communicate RF signals between a master unit of the distributed antenna system and a terminal device; and
receive downlink RF signals from a base station; and
signal processing circuitry configured to:
provide downlink signals to the master unit;
wherein the remote unit receives instructions from a host unit of the distributed antenna system to establish a different communication link with the base station in response to detecting a malfunction with respect to an additional communication link between the master unit and an additional base station.

12. The remote unit of claim 11, wherein the remote unit further comprises:
a first duplexer configured to:
isolate downlink RF signals transmitted to the terminal device from uplink RF signals received from the terminal device; and
a second duplexer configured to:
isolate the uplink RF signals transmitted to the base station from downlink RF signals received from the base station.

13. The remote unit of claim 11, wherein the remote unit further comprises:
a configurable isolation sub-system that is configured to operate in a first mode and a second mode, wherein the configurable isolation sub-system is configured to:
isolate downlink RF signals transmitted to the terminal device from uplink RF signals received from the terminal device when operating in a first mode; and
isolate the uplink RF signals transmitted to the base station from downlink RF signals received from the base station.

14. The remote unit of claim 13, wherein the configurable isolation sub-system includes:
at least one configurable filter configured to:
attenuate signals outside of a first frequency band for receiving the downlink RF signals from the base station when operating in the first mode; and
attenuate signals outside of a second frequency band for receiving the uplink RF signals from the terminal device when operating in the second mode.

15. The remote unit of claim 11, wherein the signal processing circuitry is further configured to:
convert the RF signals received from the base station to the downlink signals provided to the master unit.

16. A distributed antenna system for providing device-to-device communication, the distributed antenna system comprising:
a first remote unit having first circuitry, the first remote unit configured to:
receive at least one signal from a first base station;
when the at least one signal is received at a signal level that exceeds a threshold signal level, switch to a receive mode for receiving signals from the first base station;
when the at least one additional signal is received at an additional signal level that does not exceed the threshold signal level, switch to a transmit mode for transmitting signals to a terminal device;
a second remote unit having second circuitry, the second remote unit configured to transmit the at least one signal to the terminal device; and
a master unit having third circuitry and communicatively coupled to the first and second remote units, the master unit configured to receive the at least one signal from the first remote unit and provide the at least one signal to the second remote unit for transmission to the terminal device.

17. The distributed antenna system of claim 16, wherein the master unit is further configured to:
determine that the first base station is closer to a first geographical location of the first remote unit than a second geographical location of the second remote unit; and
based on the first base station being closer to the first geographical location:
set the first remote unit to a receive mode for receiving signals from the first base station; and
set the second remote unit to a transmit mode for transmitting signals to the terminal device.

18. The distributed antenna system of claim 16, wherein the first remote unit comprises a plurality of remote units configured to receive the at least one signal from the first base station, wherein the master unit is further configured to:
receive the at least one signal from each of the plurality of remote units;
combine the at least one signal received from the plurality of remote units into a combined signal; and
provide the combined signal to the second remote unit for transmission to the terminal device.

19. The distributed antenna system of claim 16, wherein the first remote unit is further configured to:
receive downlink RF signals from a base station; and provide downlink signals to the master unit;

wherein the master unit is configured to transmit the downlink signals received from the first remote unit to the second remote unit.

20. The distributed antenna system of claim 19, wherein the first remote unit is further configured to:

convert the downlink RF signals received from the base station to the digital downlink signals provided to the master unit.

* * * * *